US012035450B2

(12) United States Patent
Zhang

(10) Patent No.: US 12,035,450 B2
(45) Date of Patent: Jul. 9, 2024

(54) LAMINAR ELECTROSTATIC ELIMINATOR CIRCUIT FOR ELIMINATING STATIC ELECTRICITY IN A SPACE

(71) Applicant: SHENZHEN KESD TECHNOLOGY CO., LTD, Guangdong (CN)

(72) Inventor: Wenkui Zhang, Guangdong (CN)

(73) Assignee: SHENZHEN KESD TECHNOLOGY CO., LTD, Guangdong (CN)

( * ) Notice: Subject to any disclaimer, the term of this patent is extended or adjusted under 35 U.S.C. 154(b) by 265 days.

(21) Appl. No.: 17/632,121

(22) PCT Filed: Sep. 14, 2021

(86) PCT No.: PCT/CN2021/118351

§ 371 (c)(1),
(2) Date: Feb. 1, 2022

(87) PCT Pub. No.: WO2022/057801

PCT Pub. Date: Mar. 24, 2022

(65) Prior Publication Data

US 2023/0363072 A1 Nov. 9, 2023

(30) Foreign Application Priority Data

Sep. 16, 2020 (CN) ......................... 202010911009.3

(51) Int. Cl.
*H05F 3/04* (2006.01)
*H02M 3/335* (2006.01)
*H05F 3/02* (2006.01)

(52) U.S. Cl.
CPC .......... *H05F 3/04* (2013.01); *H02M 3/33507* (2013.01); *H05F 3/02* (2013.01)

(58) Field of Classification Search
CPC ............. H02M 1/088; H02M 3/33507; H02M 3/33569; H02M 7/103; H05F 3/00; H05F 3/02; H05F 3/04; H05K 9/0067
See application file for complete search history.

(56) References Cited

U.S. PATENT DOCUMENTS 4,689,715 A * 8/1987 Halleck ..................... H05F 3/04 361/231
7,889,477 B2 * 2/2011 Neubarth ............ H02M 3/3384 361/212

(Continued)

FOREIGN PATENT DOCUMENTS

CN 2170619 Y 6/1994
CN 202276536 U 6/2012

(Continued)

OTHER PUBLICATIONS

First Office Action of priority document CN 202010911009.3 on Jun. 7, 2021.

(Continued)

*Primary Examiner* — Jared Fureman
*Assistant Examiner* — Nicolas Bellido
(74) *Attorney, Agent, or Firm* — IP & T GROUP LLP

(57) ABSTRACT

A laminar electrostatic eliminator circuit includes a main control module, a control instruction sending unit, a first driving circuit, a first boost circuit, a second driving circuit, and a second boost circuit. A signal input terminal of the main control module is connected to an instruction sending terminal of the control instruction sending unit, a control terminal of the main control module is connected to an input terminal of the first driving circuit and an input terminal of the second driving circuit.

19 Claims, 2 Drawing Sheets

(56) References Cited

U.S. PATENT DOCUMENTS

| | | | | |
|---|---|---|---|---|
| 7,920,368 | B2 * | 4/2011 | Fujiwara | H01T 23/00 361/231 |
| 8,587,917 | B2 * | 11/2013 | Fujita | H01T 23/00 361/231 |
| 2008/0316773 | A1 | 12/2008 | Neubarth et al. | |
| 2014/0240887 | A1 | 8/2014 | Canham | |

FOREIGN PATENT DOCUMENTS

| | | | | |
|---|---|---|---|---|
| CN | 102612246 | A | | 7/2012 |
| CN | 203661399 | U | | 6/2014 |
| CN | 107834360 | A | | 3/2018 |
| CN | 210161878 | U | | 3/2020 |
| CN | 112039320 | A | | 12/2020 |
| JP | H07153549 | A | | 6/1995 |
| JP | H09320791 | A | | 12/1997 |
| JP | H11230017 | A | | 8/1999 |
| JP | 2008135329 | A | | 6/2008 |
| JP | 2010080425 | A | | 4/2010 |
| JP | 2011054579 | A | | 3/2011 |
| JP | 2012-79528 | A | | 4/2012 |
| JP | 2012079714 | A | | 4/2012 |
| JP | 2013064358 | A | | 4/2013 |
| JP | 2017004930 | A | | 1/2017 |
| JP | 2017138356 | A | | 8/2017 |
| KR | 20110032438 | A | * | 9/2009 |
| KR | 20150068212 | A | * | 12/2013 |
| WO | 2017138356 | A1 | | 8/2017 |

OTHER PUBLICATIONS

First search of priority document CN 202010911009.3.

Decision to Grant a Patent for the Japanese Patent Application No. 2021-571762 issued by the Japanese Patent Office on Oct. 31, 2023.

International Search Report for the PCT Application No. PCT/CN2021/118351 issued by the International Searching Authority on Nov. 16, 2021.

Office Action for the Japanese Patent Application No. 2021-571762 issued by the Japanese Patent Office on Jan. 31, 2023.

Office Action for the Japanese Patent Application No. 2021-571762 issued by the Japanese Patent Office on Jun. 27, 2023.

Office Action for the Korean Patent Application No. 10-2022-7001208 issued by the Korean Intellectual Property Office on Oct. 15, 2023.

Written Opinion for the PCT Application No. PCT/CN2021/118351 by the International Searching Authority on Nov. 16, 2021.

* cited by examiner

LAMINAR ELECTROSTATIC ELIMINATOR CIRCUIT FOR ELIMINATING STATIC ELECTRICITY IN A SPACE

CROSS-REFERENCE TO RELATED APPLICATION

This application is a National Phase application of PCT application no. PCT/CN2021/118351 filed on Sep. 14, 2021, which claims the priority to the Chinese patent application with the filing No. 202010911009.3, filed on Sep. 16, 2020 with the Chinese Patent Office, and entitled "Laminar Electrostatic Eliminator Circuit", the contents of which are incorporated herein by reference in entirety.

TECHNICAL FIELD

The present disclosure relates to the technical field of electrostatic eliminators, in particular to a laminar electrostatic eliminator circuit.

BACKGROUND ART

In a production workshop, countless dust is diffused, and the dust will carry static electricity in the processes of floating and rubbing and colliding with each other. Thus, the dust in the air has three states: positively charged, negatively charged, and uncharged. When floating, if the dust encounters an object with static electricity, the dust with different electrical properties will be quickly stuck. The charged dust also possibly polarizes objects with electrical conductivity to form electric fields attracting each other, so that the dust is adsorbed on surfaces of the objects. When such a situation occurs on a circuit board, it is difficult to stick the dust away with a sticky roller due to the existence of acting force of positive and negative electricity attracting each other, and it is quite easy to become a defect point. To avoid occurrence of such problem, it is necessary to eliminate the charged dust, and it is a very good choice to use ion wind to eliminate static electricity of the dust in a space. When the ion wind with both positive electricity and negative electricity is blown out, the electrical property of the dust in the region covered by the ion wind will be neutralized by the charges in the ion wind. In a dustless plant, in order to maintain a dustless environment, great financial and material resources need to be consumed. An FFU (Fan Filter Unit) and an electrostatic eliminator are often adopted in the plants to maintain a dustless and electrostatic-free environment in the workshop. The electrostatic eliminator can eliminate the static electricity in the coverage area, but cannot eliminate the static electricity outside the area, forming a condition that only the product can be subjected to electrostatic protection but the environment cannot be protected. Therefore, in order to reduce the dust in the space, the static electricity in the space needs to be eliminated first, and then the cleanness degree in the workshop may be further improved. The applicant proposed the patent for utility model with the patent filing No. 2020208832755, entitled "Laminar Electrostatic Eliminator".

SUMMARY

The present disclosure provides a laminar electrostatic eliminator circuit, for eliminating static electricity in a coverage area and enabling a space to be maintained in a relatively balanced voltage environment. The present disclosure provides the following technical solution: a laminar electrostatic eliminator circuit, which may include a main control module, a control instruction sending unit, a first driving circuit, a first boost circuit, a second driving circuit, and a second boost circuit, wherein a signal input terminal of the main control module may be connected to an instruction sending terminal of the control instruction sending unit, a control terminal of the main control module may be connected to an input terminal of the first driving circuit and an input terminal of the second driving circuit, an output terminal of the first driving circuit may be connected to an input terminal of the first boost circuit, and an output terminal of the first boost circuit may be connected to a positive high voltage terminal output; an output terminal of the second driving circuit may be connected to an input terminal of the second boost circuit, and an output terminal of the second boost circuit may be connected to a negative high voltage terminal output.

Optionally, the control instruction sending unit may include a pin header J1, a resistor R1, a resistor R2, and a resistor R3, wherein a pin 1 of the pin header J1 may be connected to a negative-high-voltage generating control signal terminal input, and may be connected to an input terminal of the resistor R3, an output terminal of the resistor R3 may be connected to an input terminal of the resistor R2, and may be connected to a pin 4 of the pin header J1, an output terminal of the resistor R2 may be connected to a pin 24 of the chip U1, and may be connected to an input terminal of the capacitor C1, an output terminal of the capacitor C1 may be grounded, and a pin 2 of the pin header J1 may be connected to a positive-high-voltage generating control signal terminal input.

Optionally, the main control module 1 uses the chip U1 as a main control chip, the negative-high-voltage generating control signal is transmitted to the chip U1 through a pin 3 of the pin header J1, the positive-high-voltage generating control signal is transmitted to the chip U1 through a pin 4 of the pin header J1, and the chip U1 receives the positive-high-voltage generating control signal and the negative-high-voltage generating control signal.

Optionally, the first driving circuit may include a resistor R4, a resistor R5, a triode Q1, and a triode Q2, wherein an input terminal of the resistor R4 may be connected to a pin 12 of the chip U1, an output terminal of the resistor R4 may be connected to a base of the triode Q1, and an emitter of the triode Q1 may be grounded; an input terminal of the resistor R5 may be connected to a pin 11 of the chip U1, an output terminal of the resistor R5 may be connected to a base of the triode Q2, and an emitter of the triode Q2 may be grounded.

Optionally, the first boost circuit may include a transformer T1, a capacitor C2, a capacitor C3, a capacitor C4, a diode D1, and a diode D2, wherein a pin 1 of the transformer T1 may be connected to the collector of the triode Q1, a pin 2 of the transformer T1 may be grounded, a pin 3 of the transformer T1 may be connected to the collector of the triode Q2, a pin 4 of the transformer T1 may be connected to an input terminal of the capacitor C2, an output terminal of the capacitor C2 may be connected to an output terminal of the diode D1, and may be connected to an input terminal of the diode D2, a pin 5 of the transformer T1 may be connected to an input terminal of the diode D1 and an input terminal of the capacitor C3, and may be grounded, an output terminal of the capacitor C3 may be connected to the input terminal of the diode D2, and may be connected to an input terminal of a resistor R6, an output terminal of the resistor R6 may be connected to an input terminal of the capacitor C4, and may be connected to a +HV-OUT positive high voltage terminal output, and the output terminal of the capacitor C4 may be grounded.

Optionally, the second driving circuit may include a resistor R7, a resistor R8, a triode Q3, and a triode Q4, wherein an input terminal of the resistor R7 may be connected to the pin 1 of the chip U1, an output terminal of the resistor R7 may be connected to a base of the triode Q3, and an emitter of the triode Q3 may be grounded; an input terminal of the resistor R8 may be connected to a pin 2 of the chip U1, an output terminal of the resistor R5 may be connected to a base of the triode Q4, and an emitter of the triode Q4 may be grounded.

Optionally, the second boost circuit may include a transformer T2, a capacitor C5, a capacitor C6, a capacitor C7, a diode D3, and a diode D4, a pin 1 of the transformer T2 may be connected to the collector of the triode Q3, a pin 2 of the transformer T2 may be grounded, a pin 3 of the transformer T2 may be connected to a collector of the triode Q4, a pin 4 of the transformer T2 may be connected to an input terminal of the capacitor C6, and may be grounded, an output terminal of the capacitor C6 may be connected to an input terminal of the resistor R9, and may be connected to an input terminal of the diode D4; a pin 5 of the transformer T2 may be connected to an input terminal of the capacitor C5, an output terminal of the capacitor C5 may be connected to an output terminal of the diode D4 and then connected to an input terminal of the diode D3, an output terminal of the diode D3 may be connected to an input terminal of the capacitor C6, an output terminal of the resistor R9 may be connected to an input terminal of the capacitor C7, and may be connected to –HV-OUT negative high voltage terminal output, and an output terminal of the capacitor C7 may be grounded.

Optionally, models of the transformer T1 and the transformer T2 may be both kesd-24e, and models of the triode Q1, the triode Q2, the triode Q3, and the triode Q4 may be all 8050.

Optionally, the main control module may use a chip U1 as a main control chip, and the model of the chip U1 may be stm8s003.

Optionally, the main control module 1 uses a chip U1 as a main control chip, and the chip U1 is configured to control on or off of the triode Q1, the triode Q2, the triode Q3, and the triode Q4.

In the complex environment of a production workshop, countless dust is diffused, the dust will carry static electricity in the processes of floating, and rubbing and colliding with each other, the charged dust possibly polarizes objects with electrical conductivity to form electric fields attracting each other, so that the dust is adsorbed on surfaces of the objects. Therefore, in order to reduce the dust in the space, the static electricity in the space needs to be eliminated first, and then the cleanness degree in the workshop may be further improved. Compared with the related art, the laminar electrostatic eliminator using the above circuit provided in the present disclosure will continuously generate positive and negative ions, so that the space is kept in a relatively balanced voltage environment.

Figure 1:
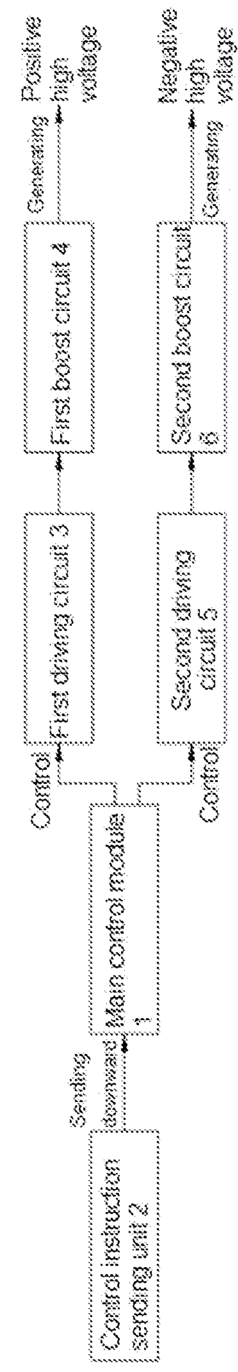
FIG. 1 is a principle block diagram of the present disclosure.

In the drawings: 1. main control module; 2. control instruction sending unit; 3. first driving circuit; 4. first boost circuit; 5. second driving circuit; 6. second boost circuit.

DETAILED DESCRIPTION OF EMBODIMENTS

The technical solutions in the embodiments of the present disclosure will be described clearly and completely below in conjunction with the accompanying drawings in the embodiments of the present disclosure, and apparently, some but not all embodiments of the present disclosure are described. All of other embodiments obtained by those ordinarily skilled in the art based on the embodiments in the present disclosure without using creative efforts shall fall within the scope of protection of the present disclosure.

Referring to FIG. 1, such laminar electrostatic eliminator circuit may include a main control module 1, a control instruction sending unit 2, a first driving circuit 3, a first boost circuit 4, a second driving circuit 5, and a second boost circuit 6. A signal input terminal of the main control module 1 may be connected to an instruction sending terminal of the control instruction sending unit 2, a control terminal of the main control module 1 may be connected to an input terminal of the first driving circuit 3 and an input terminal of the second driving circuit 5. An output terminal of the first driving circuit 3 may be connected to an input terminal of the first boost circuit 4, and an output terminal of the first boost circuit 4 may be connected to a positive high voltage terminal output; an output terminal of the second driving circuit 5 may be connected to an input terminal of the second boost circuit 6, and an output terminal of the second boost circuit 6 may be connected to a negative high voltage terminal output.

Figure 2:
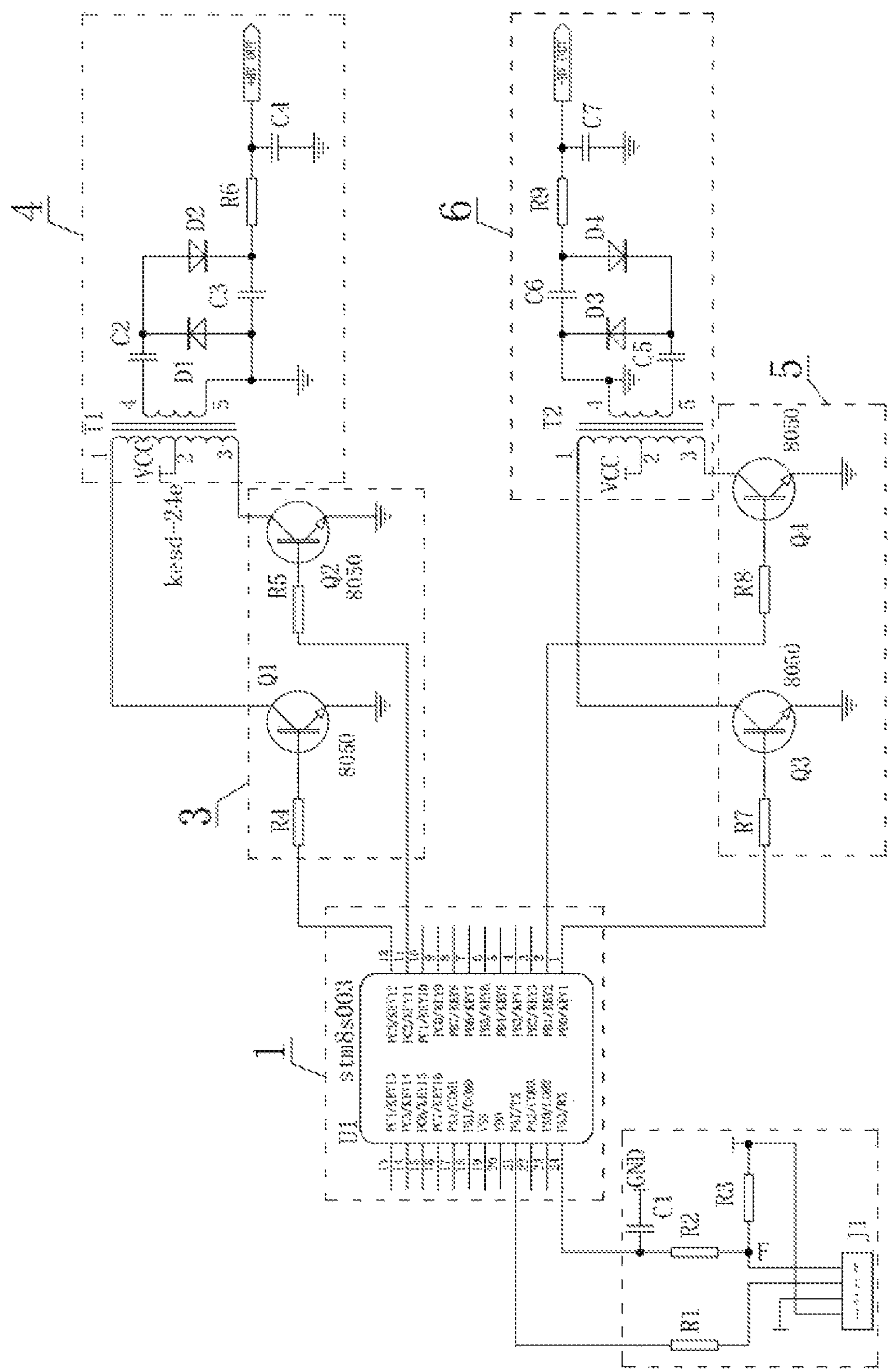
FIG. 2 is a working principle diagram of the present disclosure.

Referring to FIG. 2, the main control module 1 may use a chip U1 as a main control chip, the model of the chip U1 may be stm8s003, and the chip U1 may be configured to control off of a triode Q1, a triode Q2, a triode Q3, and a triode Q4.

Referring to FIG. 2, the control instruction sending unit 2 may include a pin header J1, a resistor R1, a resistor R2, and a resistor R3. A pin 1 of the pin header J1 may be connected to a negative-high-voltage generating control signal terminal input, and may be connected to an input terminal of the resistor R3, an output terminal of the resistor R3 may be connected to an input terminal of the resistor R2, and may be connected to a pin 4 of the pin header J1, an output terminal of the resistor R2 may be connected to a pin 24 of the chip U1, and may be connected to an input terminal of the capacitor C1, an output terminal of the capacitor C1 may be grounded, and a pin 2 of the pin header J1 may be connected to a positive-high-voltage generating control signal terminal input.

By adopting the above solution, the pin 1 of the pin header J1 may be connected to the negative-high-voltage generating control signal terminal input, the pin 2 of the pin header J1 may be connected to the positive-high-voltage generating control signal terminal input, then, the negative-high-voltage generating control signal may be transmitted to the chip U1 through a pin 3 of the pin header J1, the positive-high-voltage generating control signal may be transmitted to the chip U1 through a pin 4 of the pin header J1, and the chip U1 may receive the positive-high-voltage generating control signal and the negative-high-voltage generating control signal.

Referring to FIG. 2, the first driving circuit 3 may include a resistor R4, a resistor R5, a triode Q1, and a triode Q2, an input terminal of the resistor R4 may be connected to a pin 12 of the chip U1, an output terminal of the resistor R4 may be connected to a base of the triode Q1, and an emitter of the triode Q1 may be grounded; an input terminal of the resistor R5 may be connected to a pin 11 of the chip U1, an output terminal of the resistor R5 may be connected to a base of the triode Q2, and an emitter of the triode Q2 may be grounded.

By adopting the above solution, when the chip U1 receives the positive-high-voltage generating control signal, a control instruction may be sent to a collector of the triode Q1 and a collector of the triode Q2, and at this time, the triode Q1 and the triode Q2 both reach an on voltage, and supply power for the operation of a back-end transformer T1.

Referring to FIG. 2, the first boost circuit 4 may include the transformer T1, a capacitor C2, a capacitor C3, a capacitor C4, a diode D1, and a diode D2. The model of the transformer T1 may be kesd-24e, and models of the triode Q1 and the triode Q2 may be both 8050. A pin 1 of the transformer T1 may be connected to the collector of the triode Q1, a pin 2 of the transformer T1 may be grounded, a pin 3 of the transformer T1 may be connected to the collector of the triode Q2, a pin 4 of the transformer T1 may be connected to an input terminal of the capacitor C2, an output terminal of the capacitor C2 may be connected to an output terminal of the diode D1, and may be connected to an input terminal of the diode D2, a pin 5 of the transformer T1 may be connected to an input terminal of the diode D1 and an input terminal of the capacitor C3, and may be grounded, an output terminal of the capacitor C3 may be connected to the input terminal of the diode D2, and may be connected to an input terminal of a resistor R6, an output terminal of the resistor R6 may be connected to an input terminal of the capacitor C4, and may be connected to a +HV-OUT positive high voltage terminal output, and the output terminal of the capacitor C4 may be grounded.

By adopting the above solution, when both the triode Q1 and the triode Q2 reach the on voltage, the transformer T1 is energized, and at this time, the input voltage is transformed by the transformer T1 to generate a positive high voltage, and the positive high voltage is output through the +HV-OUT positive high voltage terminal.

Referring to FIG. 2, the second driving circuit 5 may include a resistor R7, a resistor R8, a triode Q3, and a triode Q4. An input terminal of the resistor R7 may be connected to the pin 1 of the chip U1, an output terminal of the resistor R7 may be connected to a base of the triode Q3, and an emitter of the triode Q3 may be grounded; an input terminal of the resistor R8 may be connected to a pin 2 of the chip U1, an output terminal of the resistor R5 may be connected to a base of the triode Q4, and an emitter of the triode Q4 may be grounded.

By adopting the above solution, when the chip U1 receives the negative-high-voltage generating control signal, the control instruction is sent to a collector of the triode Q3 and a collector of the triode Q4, and at this time, the triode Q3 and the triode Q4 both reach the on voltage, and supply power for the operation of a back-end transformer T2.

Referring to FIG. 2, the second boost circuit 6 may include the transformer T2, a capacitor C5, a capacitor C6, a capacitor C7, a diode D3, and a diode D4. The model of the transformer T2 may be kesd-24e, and models of the triode Q3 and the triode Q4 may be both 8050. A pin 1 of the transformer T2 may be connected to the collector of the triode Q3, a pin 2 of the transformer T2 may be grounded, a pin 3 of the transformer T2 may be connected to a collector of the triode Q4, a pin 4 of the transformer T2 may be connected to an input terminal of the capacitor C6, and may be grounded, an output terminal of the capacitor C6 may be connected to an input terminal of the diode D9, and may be connected to an input terminal of the diode D4; a pin 5 of the transformer T2 may be connected to an input terminal of the capacitor C5, an output terminal of the capacitor C5 may be connected to an output terminal of the diode D4 and then connected to an input terminal of the diode D3, an output terminal of the diode D3 may be connected to an input terminal of the capacitor C6, an output terminal of the resistor R9 may be connected to an input terminal of the capacitor C7, and may be connected to –HV-OUT negative high voltage terminal output, and an output terminal of the capacitor C7 may be grounded.

By adopting the above solution, when both the triode Q3 and the triode Q4 reach the on voltage, the transformer T2 is energized, and at this time, the input voltage is transformed by the transformer T2 to generate a negative high voltage, and the negative high voltage is output through the –HV-OUT negative high voltage terminal.

The working principle of the laminar electrostatic eliminator circuit is as follows:

First step: the pin 1 of the pin header J1 is connected to the negative-high-voltage generating control signal terminal input, and the pin 2 of the pin header J1 is connected to the positive-high-voltage generating control signal terminal input.

Second step: the negative-high-voltage generating control signal and the positive-high-voltage generating control signal are transmitted to the chip U1, and the chip U1 receives the positive-high-voltage generating control signal and the negative-high-voltage generating control signal; when the chip U1 receives the positive-high-voltage generating control signal, the control instruction is sent to the collector of the triode Q1 and the collector of the triode Q2, at this time, the triode Q1 and the triode Q2 both reach the on voltage, to supply power for the operation of the back-end transformer T1, and when the chip U1 receives the negative-high-voltage generating control signal, the control instruction is sent to the collector of the triode Q3 and the collector of the triode Q4, at this time, the triode Q3 and the triode Q4 both reach the on voltage, to supply power for the operation of the back-end transformer T2.

Third step: after the transformer T1 is energized, the input voltage is transformed by the transformer T1 to generate a positive high voltage, and the positive high voltage is output through the +HV-OUT positive high voltage terminal; and the transformer T2 is energized, and at this time, the input voltage is transformed by the transformer T2, to generate a negative high voltage, and the negative high voltage is output through the –HV-OUT negative high voltage terminal.

When the laminar electrostatic eliminator circuit eliminates the static electricity, after the chip U1 receives the positive-high-voltage generating control signal and the negative-high-voltage generating control signal, the triode Q1, the triode Q2, the triode Q3, and the triode Q4 will be quickly controlled to be turned on, the first boost circuit 4 is controlled to generate +HV-OUT positive high voltage and the second boost circuit 6 is controlled to generate –HV-OUT negative high voltage, generating relatively balanced positive and negative ions to keep the space in a relatively balanced voltage environment, effectively removing static electricity generated in the environment and avoiding the occurrence of the phenomenon of reverse charging effect. The electrostatic eliminator having the circuit of the present disclosure is provided with a filtering device, mounted in an upper part of the workshop or work station, to produce laminar gentle wind and blow the generated ions into the workshop environment, thus providing a dustless and electrostatic-free processing environment.

The above-mentioned are merely for specific embodiments of the present disclosure, but the scope of protection of the present disclosure is not limited thereto, and any equivalent substitutions or changes made by the person skilled familiar with the technical field within the technical scope disclosed in the present disclosure should be fall within the scope of protection of the present disclosure.

INDUSTRIAL APPLICABILITY

The present disclosure provides a laminar electrostatic eliminator circuit, including a main control module, a control instruction sending unit, a first driving circuit, a first boost circuit, a second driving circuit, and a second boost circuit. A signal input terminal of the main control module is connected to an instruction sending terminal of the control instruction sending unit, a control terminal of the main control module is connected to an input terminal of the first driving circuit and an input terminal of the second driving circuit. In the complex environment of a production workshop, countless dust is diffused, the dust will carry static electricity in the processes of floating, and rubbing and colliding with each other, the charged dust possibly polarizes objects with electrical conductivity to form electric fields attracting each other, so that the dust is adsorbed on surfaces of the objects. Therefore, in order to reduce the dust in the space, the static electricity in the space needs to be eliminated first, and then the cleanness degree in the workshop may be further improved. The laminar electrostatic eliminator circuit provided in the present disclosure continuously generates positive and negative ions, so that the space is kept in a relatively balanced voltage environment.

Besides, it may be understood that the laminar electrostatic eliminator circuit in the present disclosure may be reproduced, and may be applied in a variety of industrial applications. For example, the laminar electrostatic eliminator circuit in the present disclosure may be used in any field in which electrostatic elimination is required.

What is claimed is:

1. A laminar electrostatic eliminator circuit, comprising a main control module, a control instruction sending unit, a first driving circuit, a first boost circuit, a second driving circuit, and a second boost circuit, wherein a signal input terminal of the main control module is connected to an instruction sending terminal of the control instruction sending unit, a first control terminal and a second control terminal of the main control module are connected to an input terminal of the first driving circuit and an input terminal of the second driving circuit respectively, an output terminal of the first driving circuit is connected to an input terminal of the first boost circuit, and an output terminal of the first boost circuit is connected to a positive high voltage terminal output; and an output terminal of the second driving circuit is connected to an input terminal of the second boost circuit, and an output terminal of the second boost circuit is connected to a negative high voltage terminal output, wherein the control instruction sending unit comprises a pin header J1, a resistor R1, a resistor R2, and a resistor R3, a pin 1 of the pin header J1 is connected to a negative-high-voltage generating control signal terminal input, and is connected to an input terminal of the resistor R3, an output terminal of the resistor R3 is connected to an input terminal of the resistor R2, and is connected to a pin 4 of the pin header J1, an output terminal of the resistor R2 is connected to a pin 24 of the chip U1 as a main control chip of the main control module, and is connected to an input terminal of a capacitor C1, an output terminal of the capacitor C1 is grounded, and a pin 2 of the pin header J1 is connected to a positive-high-voltage generating control signal terminal input.

2. The laminar electrostatic eliminator circuit according to claim 1, wherein a pin 3 of the pin header J1 is configured to transmit a negative-high-voltage generating control signal to the chip U1, the pin 4 of the pin header J1 is configured to transmit a positive-high-voltage generating control signal to the chip U1, and the chip U1 is configured to receive the positive-high-voltage generating control signal and the negative-high-voltage generating control signal.

3. The laminar electrostatic eliminator circuit according to claim 2, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

4. The laminar electrostatic eliminator circuit according to claim 2, wherein the main control module uses a chip U1 as a main control chip, and a model of the chip U1 is stm8s003.

5. The laminar electrostatic eliminator circuit according to claim 1, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

6. The laminar electrostatic eliminator circuit according to claim 5, wherein the first boost circuit comprises a transformer T1, a capacitor C2, a capacitor C3, a capacitor C4, a diode D1, and a diode D2, a pin 1 of the transformer T1 is connected to a collector of the triode Q1, a pin 2 of the transformer T1 is grounded, a pin 3 of the transformer T1 is connected to a collector of the triode Q2, a pin 4 of the transformer T1 is connected to an input terminal of the capacitor C2, an output terminal of the capacitor C2 is connected to an output terminal of the diode D1, and is connected to an input terminal of the diode D2, a pin 5 of the transformer T1 is connected to an input terminal of the diode D1 and an input terminal of the capacitor C3, and is grounded, an output terminal of the capacitor C3 is connected to the input terminal of the diode D2, and is connected to an input terminal of a resistor R6, an output terminal of the resistor R6 is connected to an input terminal of the capacitor C4, and is connected to a +HV-OUT positive high voltage terminal output, and an output terminal of the capacitor C4 is grounded.

7. The laminar electrostatic eliminator circuit according to claim 6, wherein the second boost circuit comprises a transformer T2, a capacitor C5, a capacitor C6, a capacitor C7, a diode D3, and a diode D4, a pin 1 of the transformer T2 is connected to a collector of the triode Q3, a pin 2 of the transformer T2 is grounded, a pin 3 of the transformer T2 is connected to a collector of the triode Q4, a pin 4 of the transformer T2 is connected to an input terminal of the capacitor C6, and is grounded, an output terminal of the capacitor C6 is connected to an input terminal of a resistor R9, and is connected to an input terminal of the diode D4; a pin 5 of the transformer T2 is connected to an input terminal of the capacitor C5, an output terminal of the capacitor C5 is connected to an output terminal of the diode D4 and then connected to an input terminal of the diode D3, and an output terminal of the diode D3 is connected to an input terminal of the capacitor C6; and an output terminal of the resistor R9 is connected to an input terminal of the capacitor C7, and is connected to a –HV-OUT negative high voltage terminal output, and an output terminal of the capacitor C7 is grounded.

8. The laminar electrostatic eliminator circuit according to claim 7, wherein models of the transformer T1 and the transformer T2 are both kesd-24e, and models of the triode Q1, the triode Q2, the triode Q3, and the triode Q4 are all 8050.

9. The laminar electrostatic eliminator circuit according to claim 8, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

10. The laminar electrostatic eliminator circuit according to claim 8, wherein the main control module uses the chip U1 as the main control chip, and the chip U1 is configured to control on or off of the triode Q1, the triode Q2, the triode Q3, and the triode Q4.

11. The laminar electrostatic eliminator circuit according to claim 7, wherein the main control module uses the chip U1 as the main control chip, and the chip U1 is configured to control on or off of the triode Q1, the triode Q2, the triode Q3, and the triode Q4.

12. The laminar electrostatic eliminator circuit according to claim 7, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

13. The laminar electrostatic eliminator circuit according to claim 6, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

14. The laminar electrostatic eliminator circuit according to claim 5, wherein the second driving circuit comprises a resistor R7, a resistor R8, a triode Q3, and a triode Q4, an input terminal of the resistor R7 is connected to the pin 1 of the chip U1, an output terminal of the resistor R7 is connected to a base of the triode Q3, and an emitter of the triode Q3 is grounded; and an input terminal of the resistor R8 is connected to a pin 2 of the chip U1, an output terminal of the resistor R5 is connected to a base of the triode Q4, and an emitter of the triode Q4 is grounded.

15. The laminar electrostatic eliminator circuit according to claim 14, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

16. The laminar electrostatic eliminator circuit according to claim 5, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

17. The laminar electrostatic eliminator circuit according to claim 1, wherein the main control module uses a chip U1 as a main control chip, and a model of the chip U1 is stm8s003.

18. The laminar electrostatic eliminator circuit according to claim 1, wherein the first driving circuit comprises a resistor R4, a resistor R5, a triode Q1, and a triode Q2, an input terminal of the resistor R4 is connected to a pin 12 of the chip U1, an output terminal of the resistor R4 is connected to a base of the triode Q1, and an emitter of the triode Q1 is grounded; and an input terminal of the resistor R5 is connected to a pin 11 of the chip U1, an output terminal of the resistor R5 is connected to a base of the triode Q2, and an emitter of the triode Q2 is grounded.

19. The laminar electrostatic eliminator circuit according to claim 1, wherein the main control module uses a chip U1 as a main control chip, and a model of the chip U1 is stm8s003.

* * * * *